Aug. 28, 1956        J. J. NASH        2,760,896
METHOD OF MAKING HIGH-PRESSURE NON-METALLIC TUBING
Filed May 19, 1952        2 Sheets-Sheet 1
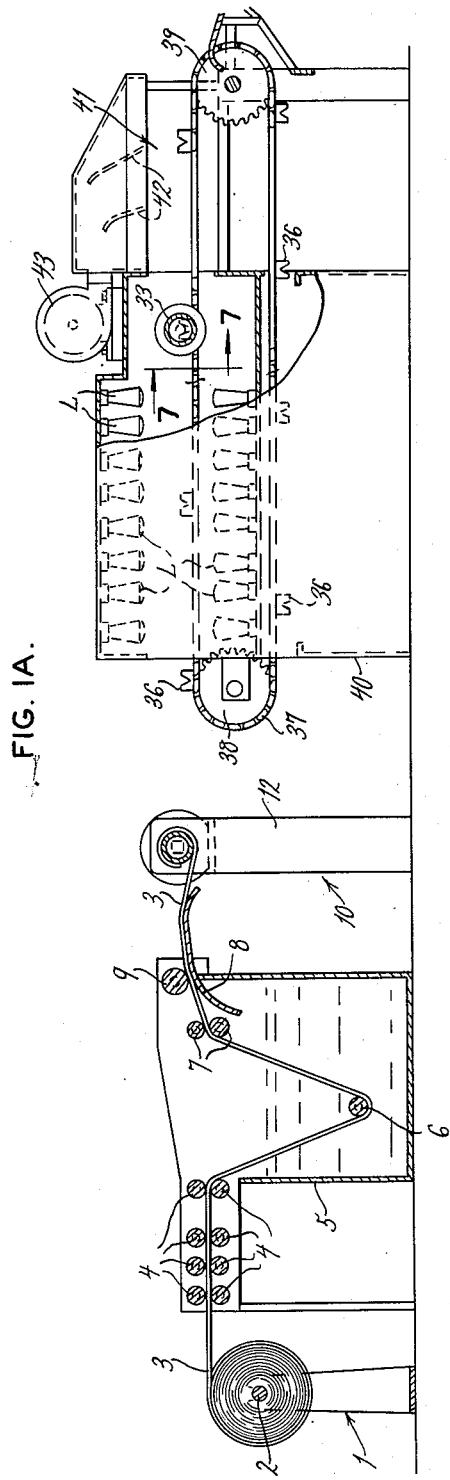
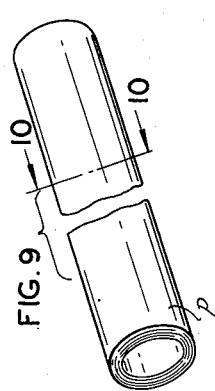
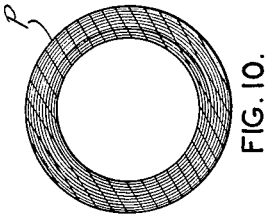
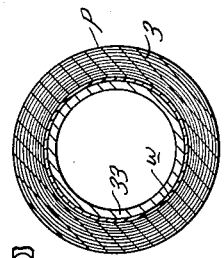
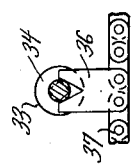
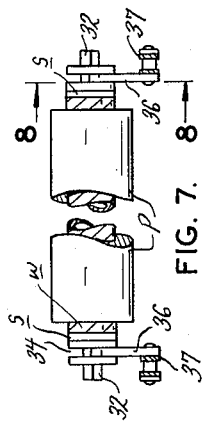
INVENTOR.
JOHN J. NASH
BY
*Alfred W. Petchaft*
ATTORNEY

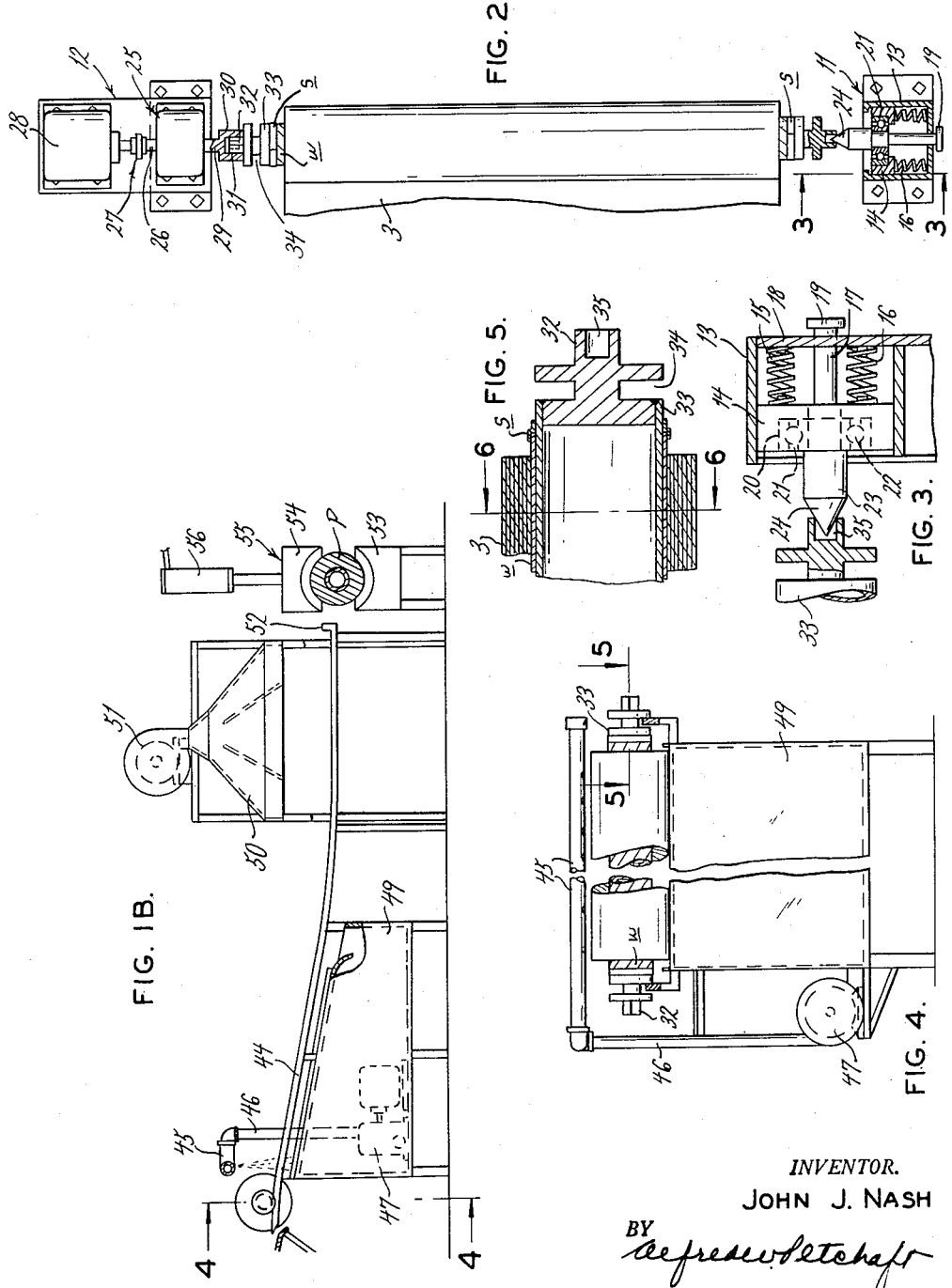

United States Patent Office 2,760,896
Patented Aug. 28, 1956

2,760,896

METHOD OF MAKING HIGH-PRESSURE NON-METALLIC TUBING

John J. Nash, Normandy, Mo., assignor, by mesne assignments, to American Fixture, Inc., a corporation of Missouri Application May 19, 1952, Serial No. 288,648

5 Claims. (Cl. 154—83)

This invention relates in general to certain new and useful improvements in high-pressure non-metallic tubing and methods of making the same.

In piping liquids and gases, conventional metallic pipe presents a number of problems in respect to certain industrial and military applications. For instance, in crude oil gathering systems, the piping very quickly collects an internal coating of paraffin and other similar materials, which coating builds up until the effective bore is reduced so greatly that the crude oil cannot be efficiently pumped through the piping and it then becomes necessary to lift the piping from the ground and clean it out or replace it. Various expedients have been tried without appreciable success, so that the cleansing of oil gathering lines continues to be a very costly, time-consuming and wasteful operation.

Subterranean oil and gas pipe lines, which are conventionally made of metal, also present a very serious problem which is common to all metallic structures which are in contact with, or buried in, the earth. Electrolysis is usually set up with the result that the metal is very quickly eaten away and the pipe begins to leak. At the present time, numerous efforts are being made to combat electrolytic destruction of piping beneath the ground and beneath bodies of water, such as lakes, oceanic estuaries, and the like. Oil pipe lines are paintakingly coated with various presumably neutral or electrolysis-combating materials and in some cases bars of metal standing higher in the electromotive series than the material from which the piping is made are buried in the ground near the pipe for the purpose of reversing the flow of electrolyzing ground currents, so that the metal from the bar will be deposited on the pipe, thereby preventing deterioration of, or damage to, the pipe. These expedients are both expensive and, at best, only partially successful.

Another technological application in which metallic piping has been found to be unsatisfactory relates to the construction of certain types of naval vessels to be used as mine sweepers or for similar purposes. Vessels of this type must must contain an absolute minimum of metal, so as to be unaffected by magnetic mines and similar electronic weapons.

The foregoing illustrate only a few of the many technological fields of application in which conventional metallic piping and tubing are found to be unsatisfactory and for which some type of dielectric non-magnetic piping or tubing becomes almost essential.

It is, therefore, one of the primary objects of the present invention to provide a dielectric nonmagnetic pipe or tube formed of synthetic materials and which is extremely strong, rigid, and capable of sustaining relatively high internal or bursting pressure and is, therefore, adapted for use in a wide variety of engineering applications for which hitherto only metal piping has been sufficiently strong.

Another object of the present invention is to provide a method and apparatus for manufacturing synthetic piping and tubing of the type stated.

With the above and other objects in view, my invention resides in the novel features of form, construction, arrangement, and combination of parts presently described and pointed out in the claims.

In the accompanying drawings (two sheets)—

Figures 1A and 1B are conjointly a side elevational view, partly broken away and in section, of synthetic pipe manufacturing apparatus constructed in accordance with and embodying the present invention;

Figure 2 is a top plan view of the mandrel rotating or winding device forming a part of the apparatus of the present invention;

Figure 3 is a fragmentary sectional view taken along line 3—3 of Figure 2;

Figure 4 is a fragmentary sectional view taken along line 4—4 of Figure 1B;

Figure 5 is a fragmentary sectional view taken along line 5—5 of Figure 4;

Figure 6 is a transverse sectional view taken along line 6—6 of Figure 5;

Figure 7 is a fragmentary sectional view taken along line 7—7 of Figure 1A;

Figure 8 is a fragmentary sectional view taken along line 8—8 of Figure 7;

Figure 9 is a fragmentary perspective view of a finished length or piece of synthetic tubing constructed in accordance with and embodying the present invention; and Figure 10 is a transverse sectional view taken along line 10—10 of Figure 9.

Referring now in more detail and by reference characters to the drawings, which illustrate a preferred embodiment of the present invention, 1 designates a suitable roll stand conventionally mounted upon, and extending vertically upwardly from, the floor or other suitable supporting structure for rotatably supporting a shaft 2 upon which is wound a continuous web or sheet 3 of woven fiber-glass or similar fabric-like material. The width of the web 3 will determine the length of the pipe sections ultimately to be formed and almost any convenient width may be utilized, although it has been found in connection with the present invention that webs of either sixteen or twenty feet width provide the most convenient units of size inasmuch as conventional metallic piping is commonly used in sixteen feet and twenty feet lengths and most engineering installations are laid out for piping of these more or less standard lengths.

The fiber-glass web 3 is passed between a plurality of pairs of feed rolls 4 for applying a moderate amount of tension to the web 3 and feeding it forwardly in a substantially flat wrinkle-free manner. As the web 3 leaves the forwardmost pair of feed rolls 4, it is carried downwardly into a tank 5 which is filled with a suitable synthetic resin of the thermosetting type. The web 3 passes beneath an idler roll 6 and thence upwardly between a pair of tension rolls 7 and thence upwardly and forwardly over a downwardly and rearwardly inclined drain plate 8 and beneath a squeegee roll 9, which is of relatively large diameter and is formed of soft rubber, being applied downwardly with sufficient tension to squeeze off any excess of liquid which may tend to be carried up upon the faces of the web 3 as it moves out of the synthetic resin dipping bath. Forwardly of the plate 8 is a mandrel winding stand 10 consisting of two upright of vertical pedestals 11, 12, bolted or otherwise securely mounted upon the floor in transverse alignment along a line perpendicular to the path of travel of the web 3.

The pedestal 11 is provided at its upper end with a rectangular box-like housing 13 for shiftably supporting a rectangular bearing block 14 biased inwardly toward the web path by means of compression springs 15, 16, and supported by an outwardly extending guide rod 17 which projects slidably through an end wall 18 of the housing 13 and on its outer projecting end is provided with an enlarged stop head 19. On its inwardly presented face, the bearing block 14 is provided with a bearing recess 20 for receiving a stationary ball race 21, and operatively journaled therein by means of ball bearings 22 is a rotary spindle 23 having a conically pointed end 24.

Rigidly mounted upon the opposite pedestal 12 is a conventional speed reduction gear box 25 having a driven shaft 26 connected by means of a conventional coupling 27 to an electric motor 28. The gear box 25 is further provided with a driving shaft 29 axially aligned with the spindle 23 and integrally provided on its outer end with a diametrally enlarged chuck 30 having a recess 31 of rectangular cross-section for receiving the reduced rectangular end portions 32 of a winding mandrel 33. Inwardly of its rectangular end, the mandrel is turned down in the provision of an annular groove 34. As will be seen by reference to Figure 2, both ends of the mandrel 33 are identical and the rectangular end portions 32 are provided with axially drilled circular recesses 35, so that either end may be inserted into the chuck 30 and the operators consequently do not have to be concerned with which end of the mandrel is presented toward the chuck.

The mandrel 33 is lifted by the operator into position between the pedestals 11, 12, and one end placed against the spindle point 24 which centers itself within the circular recess 35, as shown in Figure 3. The operator then pushes the mandrel 33 outwardly against the bias of the springs 15, 16, so that the opposite end portion 32 may be slipped into the recess 31 of the chuck 30.

Thereupon, the mandrel 33 is wrapped from one end to the other with a spiral winding of wax-impregnated kraft paper tape to form a protective wrapping w, the ends of which are held in place by annular wrappings s of some suitable pressure-sensitive ribbon-like material, such as Scotch tape, for example. The forwardly presented portion of the resin-saturated web 3 is then manually placed around the outer face of the wrapping w and smoothed out, so that the longitudinal end margins of the web are substantially perpendicular to the longitudinal axis of the wrapping. The motor 28 is then energized and the mandrel 33 is rotated to wind a plurality of turns or thicknesses of the web 3 around the mandrel. This turning or winding operation may be performed at any rate of speed which is convenient for the operator so long as the operator is able to observe the winding operation and see to it that each successive layer is smoothly and cohesively wound in place, sufficient tension being maintained on the feed rolls 4, the idler roll 5, and tension rolls 7 to pull the web 3 tightly around the mandrel 33 as it is being wound. When a sufficient number of layers have been wound upon the mandrel 33 to provide a tube or pipe of desired thickness, the web 3 is severed with a knife or scissors and the trailing portion manually laid down and patted in place on the mandrel-wound portion. Thereupon, the mandrel 33 is manually removed from the winding stand 10 and placed between upstanding V-shaped flight blocks 36 mounted at spaced intervals along parallel conveyor chains 37 trained around sprockets 38, 39, and extending horizontally through a tunnel-shaped oven 40 having suitable heat sources, such as a bank of infra-red lamps L. The blocks 36 are paired and spaced from each other transversely of the oven 40 by a sufficient distance so as to fit more or less freely within the annular groove 34 of the mandrel, as best seen in Figures 7 and 8, and the mandrel 33 is thus carried slowly through the oven 40 and therein subjected to a predetermined curing temperature for a selected period of time. It will be understood that the temperature and time may be varied depending upon the polymerization characteristics of the resin with which the web 3 has been impregnated.

At its forward end, the oven 40 is provided with a cooling zone 41 in which air is blown downwardly upon the wound mandrels 33 from ducts 42 by means of a conventional air blower 43 mounted preferably upon the upper wall of the oven 40. Ultimately the mandrels 33 are carried forwardly out of the open forward end of the oven 40 and deposited upon a downwardly inclined pair of rails 44 which enter the mandrel grooves 34 and allow the mandrel to roll under the influence of gravity downwardly and forwardly beneath a spray 45 of coating liquid, such as paint or any other suitable material. The coating material is supplied to the spray 45 by a vertical supply pipe 46 which is connected at its lower end to a pump 47, the intake end of which opens into the lowermost portion of a drip tank 49. The drip tank 49 extends forwardly for a sufficient distance, so that by the time the wound mandrel 33 has traversed its length, the sprayed-on exterior coating will be partially set to a sufficient degree, so that it will not drip any longer. In this connection, it may be noted that the spray does not cover the entire length of the wound mandrel, but is preferably so arranged as to leave uncoated approximately one-half to three-quarters of an inch of the outer ends of the pipe-forming material which is wound upon the mandrel 33, so that none of the paint or coating material will accidentally run off the ends and onto the mandrel. If desired, the application of a sprayed-on external coating can be eliminated, since it is primarily for decorative purposes.

The wound mandrel 33 rolls thence forwardly beneath a hot air hood 50 supplied from the top with air from a conventional heater blower 51. The mandrel 33 travels for a sufficient distance beneath the hood 50, so that the sprayed-on surface coating will be substantially dry by the time the wound mandrel 33 comes to rest against the end stops 52. The wound mandrel 33 is thereupon manually lifted by the operators and set between the arcuate jaws 53, 54, of a holding press 55 actuated preferably by a pneumatic cylinder 56 which is then filled with compressed air to force the jaws together, holding the external surface of the finished pipe P. The operator then may tap one end of the mandrel 33 gently with a rawhide hammer, driving it axially out of the pipe P and placing it in a conventional conveyor (not shown) for return to the winding stand 10. The interior wax-coated kraft wrapping w assures easy and ready parting between the pipe P and the mandrel 33, so that the mandrel 33 may be readily removed, and, after the mandrel 33 has been removed, one protruding end of the wrapping w may be manually grasped and pulled outwardly, with the result that the entire interior core or wrapping w can readily be pulled out, leaving an extremely smooth, accurately sized, precisely cylindrical interior surface or bore within the pipe P. The small uncoated marginal ends of the pipe P may then be sawed off in any conventional manner and the burrs reamed out or sanded to produce a finished section of pipe having a precise length and close tolerance diametral size.

Actual field tests with synthetic pipe constructed in accordance with the present invention have revealed that the material has practically no affinity for the wax, paraffin, and tars usually present in crude oil and, therefore, can be used in a crude oil gathering system for months on end without accumulating a bore-reducing internal layer or deposit of paraffin, wax, and the like. Pressure tests have shown that synthetic pipes and tubing made in accordance with the present invention have a bursting strength comparable to that of metallic pipes and tubes of similar weight, size, and thickness and are, therefore, entirely satisfactory for use in shipboard steam-pipe installation and the like.

In addition to this, field tests have also shown that synthetic pipes made in accordance with the present invention are electrolytically inert when buried beneath the earth or submerged beneath a body of water in the manner of conventional pipe and gas lines and, therefore, can be used for pipeline purposes without wrapping or other electrolysis-preventing expedients and affords every indication of extremely long life and durability in this type of engineering application.

It should be understood that changes and modifications in the form, construction, arrangement, and combination of the several parts of the high-pressure non-metallic tubing and in the steps of its production may be made and substituted for those herein shown and described without departing from the nature and principle of my invention.

Having thus described my invention, what I claim and desire to secure by Letters Patent is:

1. The method of making non-metallic piping and tubing which comprises impregnating a web of woven fiber glass with a liquid containing a thermosetting resin, covering a mandrel with a spiral winding of wax coated paper tape, winding the web upon the covered mandrel, severing the unwound portion of the web from the winding upon the mandrel after a desired number of layers have been built up thereon, heat curing the winding upon the mandrel, removing the mandrel, and finally pulling out the wax-coated paper winding.

2. The method of making non-metallic piping and tubing which comprises impregnating a web of fiber glass with a liquid containing a thermosetting resin, covering a mandrel with a spiral winding of wax coated paper tape, winding the web upon the covered mandrel, severing the unwound portion of the web from the winding upon the mandrel after a desired number of layers have been built up thereon, heat curing the winding upon the mandrel, removing the mandrel, and finally pulling out the wax-coated paper winding.

3. The method of making non-metallic piping and tubing which comprises impregnating a web of glass cloth with a liquid containing a thermosetting resin, covering a mandrel with a spiral winding of wax coated paper tape, winding the web cylindrically upon the covered mandrel, severing the unwound portion of the web from the winding upon the mandrel after a desired number of layer have been built up thereon, heat curing the winding upon the mandrel, thereupon removing the mandrel, and removing the tape from the interior of the pipe.

4. The method of making non-metallic piping and tubing which comprises impregnating a web of glass cloth with a liquid containing a thermosetting resin, covering a mandrel with a spiral winding of wax coated paper tape, winding the web cylindrically upon the covered mandrel with moderate pressure imposed upon the plies and removing excess liquid from the web while it is being so wound, severing the unwound portion of the web from the winding upon the mandrel after a desired number of layers have been built up thereon, heat curing the winding upon the mandrel, thereupon removing the mandrel and thereafter removing the interior paper winding.

5. The method of making non-metallic piping and tubing which comprises feeding a web of glass cloth through a solution consisting principally of a thermosetting resin, subjecting said web of material as it passes outwardly from said solution to mechanical pressure for squeegeeing any excess solution therefrom and forcing said solution into the interstices of the glass cloth, applying a spiral winding of wax-coated paper upon a mandrel, winding said web upon said mandrel which has been covered by said winding of wax-coated paper, severing the unwound portion of the web from the winding upon the mandrel after a desired number of layers have been built up thereon, suspending the mandrel by its ends in substantially horizontal position and moving it slowly between heat radiating elements until the winding is cured, thereafter cooling the heat-cured winding and mandrel, and finally removing the mandrel.

References Cited in the file of this patent

UNITED STATES PATENTS

| | | |
|---|---|---|
| 1,284,298 | Frederick | Nov. 12, 1918 |
| 1,975,515 | Mayer | Oct. 2, 1934 |
| 1,996,951 | Clark et al. | Apr. 9, 1935 |
| 2,606,269 | Wikle | Nov. 10, 1936 |
| 2,074,580 | Fourness et al. | Mar. 23, 1937 |
| 2,130,586 | Huston | Sept. 20, 1938 |
| 2,279,630 | McMahon | Apr. 14, 1942 |
| 2,318,056 | Christman | May 4, 1943 |
| 2,360,109 | Converse | Oct. 10, 1944 |
| 2,402,038 | Goldman et al. | June 11, 1946 |
| 2,434,465 | Marc | Jan. 13, 1948 |
| 2,467,999 | Stephens | Apr. 19, 1949 |
| 2,609,319 | Boge | Sept. 2, 1952 |
| 2,643,700 | Havens | June 30, 1953 |
| 2,690,413 | Nebesar | Sept. 28, 1954 |